USO12113354B2

(12) United States Patent
Jia et al.

(10) Patent No.: US 12,113,354 B2
(45) Date of Patent: Oct. 8, 2024

(54) RELAY ASSEMBLY WITH REVERSE CONNECTION PROTECTION

(71) Applicant: Suzhou Littelfuse OVS Co., Ltd., Suzhou (CN)

(72) Inventors: Yanqiu Jia, Suzhou (CN); Dan Jin, Suzhou (CN); Yu Wang, Suzhou (CN)

(73) Assignee: SUZHOU LITTELFUSE OVS CO., LTD., Suzhou (CN)

( * ) Notice: Subject to any disclaimer, the term of this patent is extended or adjusted under 35 U.S.C. 154(b) by 0 days.

(21) Appl. No.: 17/781,180

(22) PCT Filed: Dec. 5, 2019

(86) PCT No.: PCT/CN2019/123191
§ 371 (c)(1),
(2) Date: May 31, 2022

(87) PCT Pub. No.: WO2021/109054
PCT Pub. Date: Jun. 10, 2021

(65) Prior Publication Data
US 2023/0006439 A1 Jan. 5, 2023

(51) Int. Cl.
*H02H 9/02* (2006.01)
(52) U.S. Cl.
CPC .................... *H02H 9/026* (2013.01)
(58) Field of Classification Search
CPC .... H01H 71/16; H01H 50/021; H01H 50/044; H01H 50/44; H01H 50/14; H01H 50/04; H01H 47/32; H05B 45/18; H05B 45/56; H05B 45/10; H05B 1/0007; H05B 3/10; H05B 3/066; H05B 3/20; H02H 11/002; H02H 9/026; H02H 7/18; H02M 3/04
See application file for complete search history.

(56) References Cited

U.S. PATENT DOCUMENTS

| 2,854,623 | A | * | 9/1958 | Wise | G01R 31/25 |
| | | | | | 361/205 |
| 3,313,960 | A | * | 4/1967 | Borys | H01R 13/648 |
| | | | | | 250/206 |
| 4,413,301 | A | * | 11/1983 | Middleman | H01C 7/027 |
| | | | | | 219/505 |

(Continued)

FOREIGN PATENT DOCUMENTS

| CN | 201256305 | * | 6/2009 |
| CN | 201256305 Y | | 6/2009 |

(Continued)

OTHER PUBLICATIONS

English Translation of JPH04312281 (Year: 1992).*

(Continued)

*Primary Examiner* — Thienvu V Tran
*Assistant Examiner* — Nusrat Quddus
(74) *Attorney, Agent, or Firm* — KDW Firm PLLC

(57) ABSTRACT

Disclosed are electrical relay assemblies including a positive temperature coefficient thermistor (PTC) for reverse connection protection. In some embodiments, a relay assembly includes a relay socket receiving a relay, a power source connected to the relay socket, and a positive temperature coefficient thermistor (PTC) connected between the relay socket and the power source.

17 Claims, 4 Drawing Sheets

(56) References Cited

U.S. PATENT DOCUMENTS

| | | | | |
|---|---|---|---|---|
| 4,453,195 | A | * | 6/1984 | Sauer ................... H01H 50/021 |
| | | | | 361/160 |
| 4,626,764 | A | * | 12/1986 | Weinhardt ................ H02J 7/35 |
| | | | | 320/102 |
| 5,537,288 | A | * | 7/1996 | Felps ....................... G01R 1/36 |
| | | | | 361/124 |
| 5,590,010 | A | * | 12/1996 | Ceola ................ H01R 13/7137 |
| | | | | 337/13 |
| 5,793,171 | A | * | 8/1998 | Hayashi ................... H02P 7/03 |
| | | | | 318/434 |
| 6,078,160 | A | * | 6/2000 | Cilluffo ............... H02H 7/0851 |
| | | | | 318/641 |
| 6,377,434 | B1 | * | 4/2002 | Martineau ............... H04M 3/18 |
| | | | | 361/119 |
| 6,657,839 | B2 | * | 12/2003 | de Oliveira .......... H02H 11/002 |
| | | | | 361/84 |
| 6,659,783 | B2 | * | 12/2003 | Copper ............. H01R 13/6616 |
| | | | | 439/157 |
| 7,550,944 | B1 | * | 6/2009 | Rausch ..................... H02J 7/35 |
| | | | | 320/108 |
| 7,616,421 | B2 | * | 11/2009 | Hickam ................... H02H 3/14 |
| | | | | 361/84 |
| 9,601,479 | B2 | * | 3/2017 | Edwards ............ H01L 27/0255 |
| 10,396,543 | B2 | * | 8/2019 | Tanaka ...................... H01C 3/14 |
| 2001/0053228 | A1 | * | 12/2001 | Jones ................. G10K 11/1785 |
| | | | | 381/74 |
| 2002/0024784 | A1 | | 2/2002 | Pinto de Oliveira |
| 2004/0085071 | A1 | * | 5/2004 | Sankey ............. G01R 31/3278 |
| | | | | 324/418 |
| 2005/0007709 | A1 | * | 1/2005 | Wright ................... H02H 9/001 |
| | | | | 361/43 |
| 2007/0230229 | A1 | * | 10/2007 | Bryan ..................... H02H 9/001 |
| | | | | 365/32 |
| 2009/0141412 | A1 | * | 6/2009 | Hickam ................... H02H 3/14 |
| | | | | 340/653 |
| 2010/0165526 | A1 | * | 7/2010 | Dishman ................ H02H 9/026 |
| | | | | 361/58 |
| 2010/0176830 | A1 | * | 7/2010 | Watson ............. G01R 31/3278 |
| | | | | 324/756.05 |
| 2015/0189712 | A1 | * | 7/2015 | Van Endert .......... H05B 47/165 |
| | | | | 315/161 |
| 2017/0271862 | A1 | * | 9/2017 | Crispim ................... H02H 3/18 |
| 2017/0290109 | A1 | * | 10/2017 | Jiang ...................... H05B 45/56 |
| 2017/0346387 | A1 | * | 11/2017 | Davis ..................... H05B 35/00 |
| 2020/0006935 | A1 | * | 1/2020 | Francis .................. H02H 5/047 |
| 2020/0014162 | A1 | * | 1/2020 | Houry .................. H01R 13/745 |
| 2023/0050938 | A1 | * | 2/2023 | Weiland ............. H01M 50/213 |

FOREIGN PATENT DOCUMENTS

| | | | | |
|---|---|---|---|---|
| CN | 202189110 | U | | 4/2012 |
| CN | 102756655 | A | | 10/2012 |
| CN | 204348630 | U | | 5/2015 |
| DE | 19753852 | A1 | | 6/1999 |
| DE | 102007029271 | A1 | * | 12/2008 ........... H01H 47/325 |
| JP | H0431281 | U | * | 3/1992 |
| JP | 2000333366 | A | | 11/2000 |
| WO | 0217456 | A2 | | 2/2002 |
| WO | 2006047231 | A3 | | 7/2006 |

OTHER PUBLICATIONS

European Search Report and Written Opinion for the European Patent Application No. EP19955350, mailed Nov. 15, 2022, 7 pages.

International Search Report and Written Opinion mailed Sep. 8, 2020 for PCT/CN2019/123191.

* cited by examiner

RELAY ASSEMBLY WITH REVERSE CONNECTION PROTECTION

FIELD OF THE DISCLOSURE

The present disclosure generally relates to an electrical relay assembly, and more particularly, to an electrical relay assembly including a positive temperature coefficient thermistor (PTC) for reverse connection protection.

BACKGROUND OF THE DISCLOSURE

As information technologies evolve, relays, such as solid state relays or mechanical relays, are used extensively, for example, to drive loads, trigger alarms, provide on or off time delays, isolate equipment, or drive other relays to perform a specific function. In order for a relay to change status, a coil of the relay is activated or deactivated, which typically comes from an external event, such as loss of voltage, over current, ground fault detection, push button activation, or position of an upstream hand switch.

Some relay coils are integrated with a freewheeling diode for suppressing spikes cause by an inductive load to avoid damaging MOSFET/transistor or other integrated circuits connected therewith. Furthermore, some relays are pin symmetrical/mirrored. As a result, it is possible to insert relays in the wrong orientation. The diode of the relay may cause a short circuit, which damages the relay coil or printed circuit board (PCB) traces in the case the relay is mounted on a PCB.

There is a need, therefore, for a relay assembly capable of preventing an over current by short circuit.

SUMMARY OF THE DISCLOSURE

In one approach, a relay assembly may include a relay socket receiving a relay, a power source connected to the relay socket, and a positive temperature coefficient thermistor (PTC) connected between the relay socket and the power source.

In another approach, a relay protection circuit may include a relay socket for receiving pins of a relay, a power source electrically connected to the relay socket, and a positive temperature coefficient thermistor (PTC) electrically connected between the relay socket and the power source.

In another approach, a relay assembly may include a relay socket receiving pins of a relay, a power source electrically connected to the relay socket, and a positive temperature coefficient thermistor (PTC) electrically connected between the relay socket and the power source.

BRIEF DESCRIPTION OF THE DRAWINGS

The accompanying drawings illustrate exemplary approaches of the disclosed embodiments so far devised for the practical application of the principles thereof, and wherein.

Figure 1A:
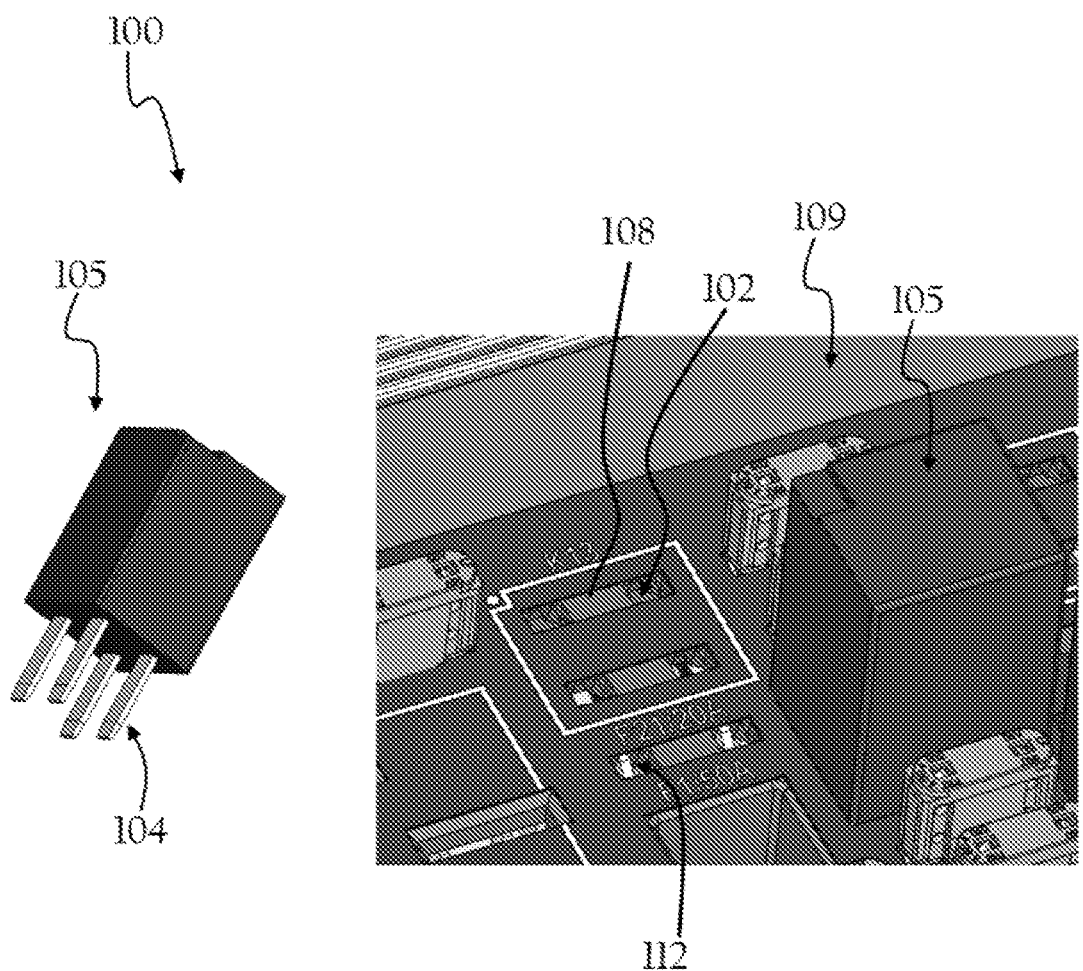
FIG. 1A depicts a perspective view of a relay assembly according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Relay assemblies and relay protection circuits in accordance with the present disclosure will now be described more fully hereinafter with reference to the accompanying drawings, where embodiments of the methods are shown. The relay assemblies and relay protection circuits may be embodied in many different forms and are not to be construed as being limited to the embodiments set forth herein. Instead, these embodiments are provided so the disclosure will be thorough and complete, and will fully convey the scope of the system and method to those skilled in the art.

Figure 1B:
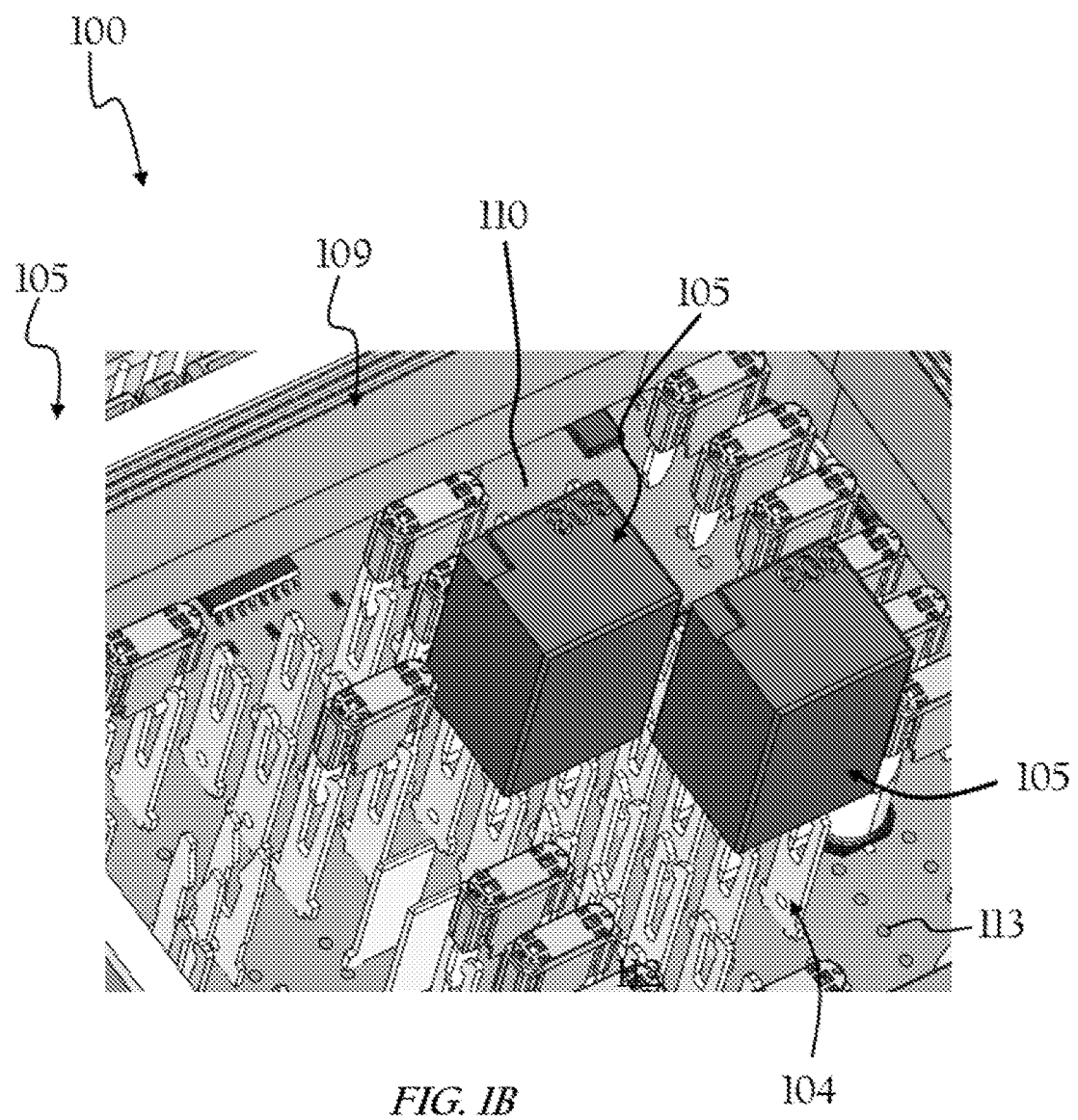
FIG. 1B depicts a perspective view of the relay of the relay assembly of FIG. 1A according to embodiments of the present disclosure.

Turning to FIGS. 1A-1B, a relay assembly (hereinafter "assembly") 100 according to embodiments of the present disclosure will be described. As shown, the assembly 100 may include a relay socket 102 for receiving pins 104 of a relay 105. In exemplary embodiments, the pins 104 of the relay 105 are symmetrical or mirrored about an axis extending through the relay 105.

The assembly 100 may further include a component grid 108 disposed within a housing 109, the component grid 108 including a plurality of openings 112, which define the relay socket 102. As shown in FIG. 1B, the assembly may further include a circuit board, such as a PCB 110, positioned beneath the component grid 108. The PCB 110 may include a plurality of electrically conductive traces (not shown) formed by a screen printing and/or a chemical etching process. In some embodiments, the PCB 110 may be made from epoxy or polyimide resins. The resin may be reinforced with a woven glass cloth or other matrix such as chopped fibers. PCBs formed of such materials are typically called FR-4 or G-10 type circuit boards. The PCB may alternately be constructed of ceramic or rigid polymers. This listing of acceptable PCB materials is not exhaustive and other materials may also be used successfully. The materials and manufacturing techniques used to form printed circuit boards are well known to those skilled in the art.

The pins 104 of the relay 105 may be are electrically coupled to the electrically conductive traces, for example, through pin openings 113 in the PCB 110. In various embodiments, the relay 105 may be a circuit board mountable electrically controlled mechanical (electromechanical) relay, or a solid-state relay device including a metal-oxide-semiconductor field-effect transistor (MOSFET). The relay 105 may be any different relay type, e.g. normally open, normally closed, etc., based on the electrical application of the assembly 100.

Figure 2A:
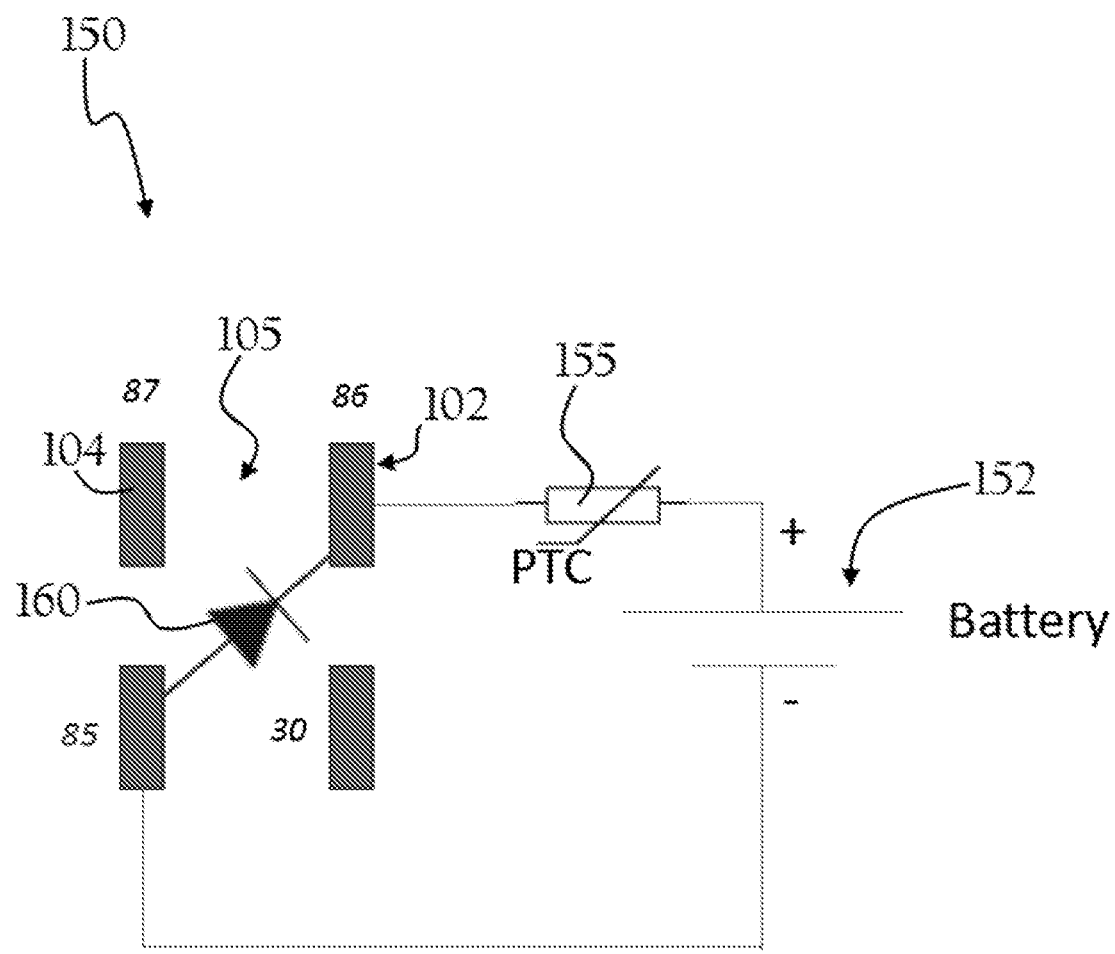
FIG. 2A is a circuit diagram of a portion of the relay assembly of FIG. 1 according to embodiments of the present disclosure.
Figure 2B:
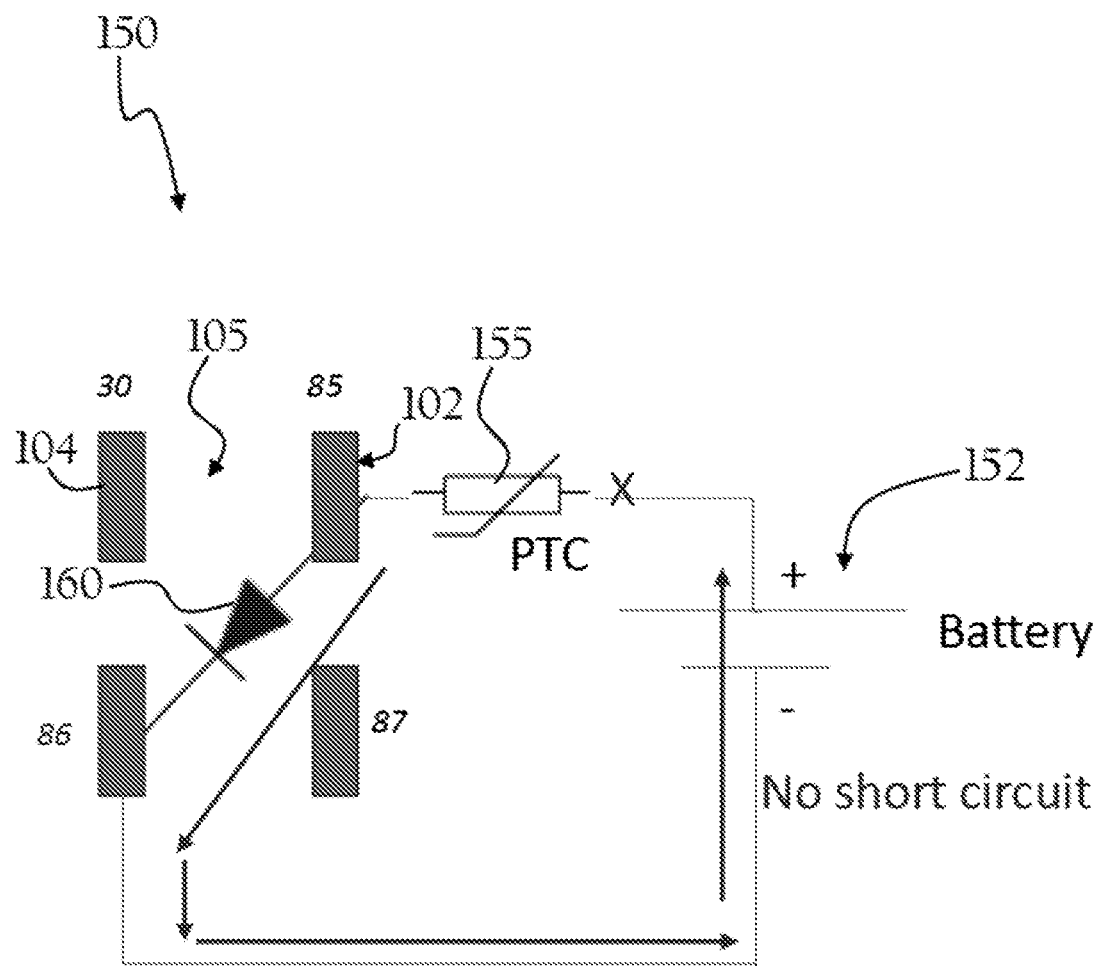
FIG. 2B is a circuit diagram of a portion of the relay assembly of FIG. 1 according to embodiments of the present disclosure.

Turning now to FIGS. 2A-2B, a relay protection circuit (hereinafter "circuit") 150 of the assembly 100 will be described. As shown, the circuit 150 may include a power source 152 electrically connected to the relay socket 102, and a positive temperature coefficient thermistor (PTC) 155 electrically connected between the relay socket 102 and the power source 152 (e.g., a battery). In some embodiments, the PTC 155 is resettable to prevent an over current from a short circuit. In some embodiments, the PTC is a polymeric PTC. As shown, the PTC 155 may be connected to a positive side of the power source 152.

Although non-limiting, the PTC material of the PTC 155 may be made of a positive temperature coefficient conductive composition comprising a polymer and a conductive filler. The polymer of the PTC material may be a crystalline polymer selected from the group consisting of polyethylene, polypropylene, polyoctylene, polyvinylidene chloride and a mixture thereof. The conductive filler may be dispersed in the polymer and is selected from the group consisting of carbon black, metal powder, conductive ceramic powder and a mixture thereof. Furthermore, to improve sensitivity and physical properties of the PTC material, the PTC conductive composition may also include an additive, such as a photo initiator, cross-link agent, coupling agent, dispersing agent, stabilizer, anti-oxidant and/or nonconductive anti-arcing filler.

In operation, the relay 105 may be connected to the circuit 150 via the socket 102. FIG. 2A demonstrates a proper orientation for the relay 105. For example, the coil of the relay 105 should be fed with a voltage (e.g., +12V) from the power source 152 to terminal/pin 86 and grounded via terminal/pin 85. Because the relay 105 includes a diode 160 (e.g., an integrated, freewheeling diode), placement of the pins 104 within the relay socket 102 would be critical if not for the presence of the PTC 155. For example, FIG. 2B demonstrates an improper orientation of the relay 105. As shown, terminal/pins 85 and 86 have been reversed (i.e., rotated by) 180°, along with the direction of the diode 160. Advantageously, the PTC 155 prevents an over current by short circuit while the relay orientation is in the improper orientation.

In sum, embodiments herein advantageously prevent damage to the relay and/or the components connected to the printed circuit board in the case the relay is inserted incorrectly. The embodiments herein advantageously increase both functionality and safety.

As used herein, an element or step recited in the singular and proceeded with the word "a" or "an" is understood as not excluding plural elements or steps, unless such exclusion is explicitly recited. Furthermore, references to "one embodiment" of the present disclosure are not intended to be interpreted as excluding the existence of additional embodiments also incorporating the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions and are both conjunctive and disjunctive in operation. For example, expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are just used for identification purposes to aid the reader's understanding of the present disclosure. The directional references do not create limitations, particularly as to the position, orientation, or use of the disclosure. Connection references (e.g., attached, coupled, connected, and joined) are to be construed broadly and may include intermediate members between a collection of elements and relative movement between elements unless otherwise indicated. As such, connection references do not necessarily infer two elements are directly connected and in fixed relation to each other.

Furthermore, identification references (e.g., primary, secondary, first, second, third, fourth, etc.) are not intended to connote importance or priority, and are used to distinguish one feature from another. The drawings are for purposes of illustration, and the dimensions, positions, order and relative sizes reflected in the drawings attached hereto may vary.

Furthermore, the terms "substantial" or "approximately," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

The invention claimed is:

1. A relay assembly, comprising:
a relay socket receiving a relay, the relay socket comprising a plurality of openings each having a same size and a same shape;
a power source connected to the relay socket; and
a positive temperature coefficient thermistor (PTC) connected between the relay socket and the power source, wherein the PTC is directly connected to a positive side of the power source, wherein the relay is connected to the relay socket via a plurality of pins, and wherein the relay includes an integrated diode directly connected between two pins of the plurality of pins, and wherein a third pin of the plurality of pins is directly connected to a negative side of the power source.

2. The relay assembly of claim 1, wherein the plurality of pins are symmetrical about an axis extending through the relay.

3. The relay assembly of claim 1, wherein the PTC is resettable.

4. The relay assembly of claim 1, wherein the PTC is a polymeric PTC.

5. The relay assembly of claim 1, wherein the power source is a battery.

6. The relay assembly of claim 1, further comprising a component grid, wherein the relay socket includes a plurality of openings through the component grid.

7. A relay protection circuit, comprising:
a relay socket for receiving pins of a relay, the relay socket comprising a plurality of openings each having a same size and a same shape;
a power source electrically connected to the relay socket; and
a positive temperature coefficient thermistor (PTC) electrically connected between the relay socket and the power source, wherein the PTC is directly connected to a positive side of the power source, wherein the relay includes an integrated diode directly connected between two of the pins of the relay, and wherein a third pin of the plurality of pins is directly connected to a negative side of the power source.

8. The relay protection circuit of claim 7, wherein the PTC is resettable.

9. The relay protection circuit of claim 7, wherein the PTC is a polymeric PTC.

10. The relay protection circuit of claim 7, wherein the power source is a battery.

11. A relay assembly, comprising:
a relay socket receiving pins of a relay, the relay socket comprising a plurality of openings each having a same size and a same shape;
a power source electrically connected to the relay socket; and
a positive temperature coefficient thermistor (PTC) electrically connected between the relay socket and the power source, wherein the PTC is directly connected to a positive side of the power source, wherein the relay includes an integrated diode directly connected between two pins of the plurality of pins, and wherein a third pin of the plurality of pins is directly connected to a negative side of the power source.

12. The relay assembly of claim 11, wherein the pins are symmetrical about an axis extending through the relay.

13. The relay assembly of claim 11, wherein the PTC is resettable.

14. The relay assembly of claim 11, wherein the PTC is a polymeric PTC.

15. The relay assembly of claim 11, wherein the power source is a battery.

16. The relay assembly of claim 11, further comprising a component grid disposed over a printed circuit board, wherein the relay socket includes a plurality of openings through the component grid, and wherein the printed circuit board includes a plurality of pin openings for receiving the pins.

17. The relay assembly of claim 11, wherein the integrated diode is a freewheeling diode.

* * * * *